Jan. 16, 1934.    H. A. ARNOLD    1,943,280

TABLE

Filed June 10, 1932

Inventor

Harold A. Arnold

By Wheeler, Wheeler and Wheeler

Attorneys

Patented Jan. 16, 1934

1,943,280

UNITED STATES PATENT OFFICE 1,943,280

TABLE

Harold A. Arnold, Knoxville, Tenn.

Application June 10, 1932. Serial No. 616,396

6 Claims. (Cl. 45—111)

This invention relates to improvements in tables.

It is the primary object of the invention to provide means whereby a table or bench with legs telescopically adjustable as to height may be provided simply and economically with novel and improved mechanism for simultaneously adjusting the height of all of the legs.

More specifically stated, it is my purpose to provide a table organization in which each leg contains a telescopically adjustable member in threaded connection with an adjusting screw housed within the leg and carrying a sprocket immediately beneath the table top, the several sprockets being linked together by a suitable chain and closed by the table top and rails, and actuated by a driving sprocket and crank.

In the drawing.

Like parts are identified by the same reference characters throughout the several views.

The term "table" as used herein is used generically to describe any form of table, bench, desk or cabinet in which the features of the present invention may be usefully employed. The device illustrated has a conventional table top 5 supported by four legs 6 which are connected by the usual side rails 7 disposed immediately below the top.

Figure 1:
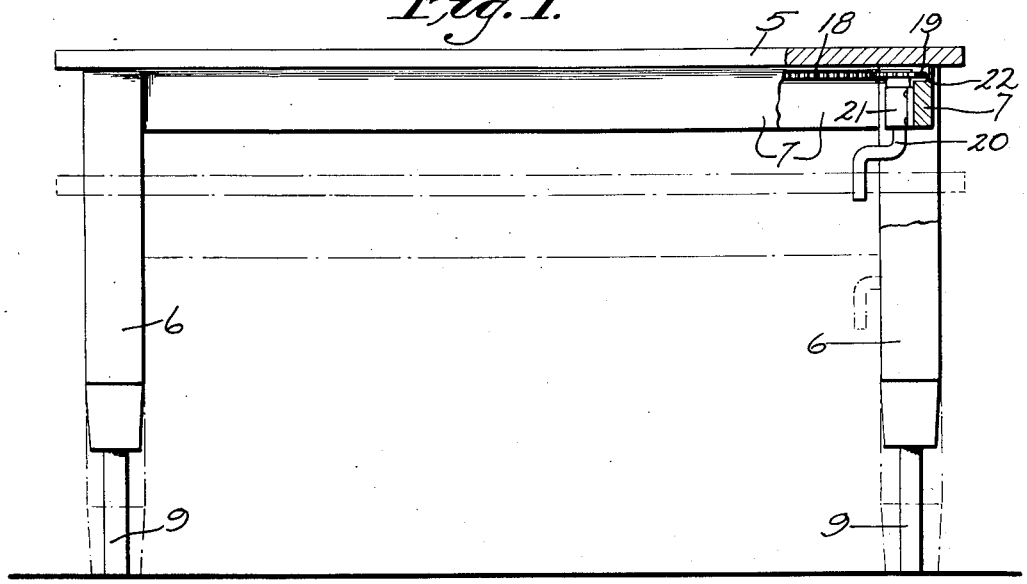
Figure 1 is a side elevation of a table embodying this invention, with a portion of its end broken away to a section exposing the operating mechanism.
Figure 2:
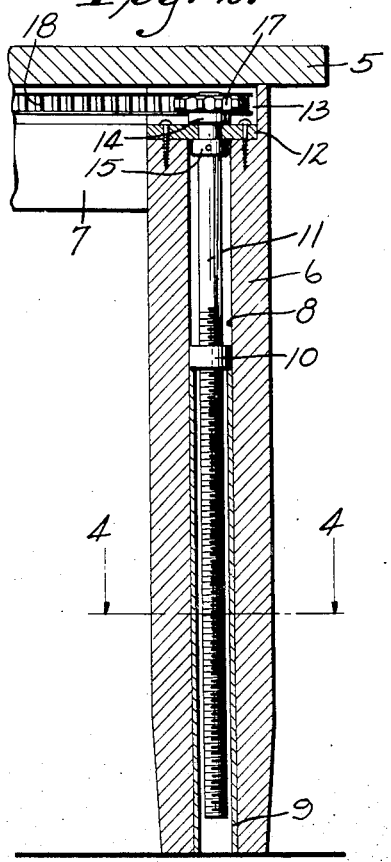
Figure 2 is an enlarged detail view taken in section in the plane indicated at 2—2 in Figure 3.
Figure 3:
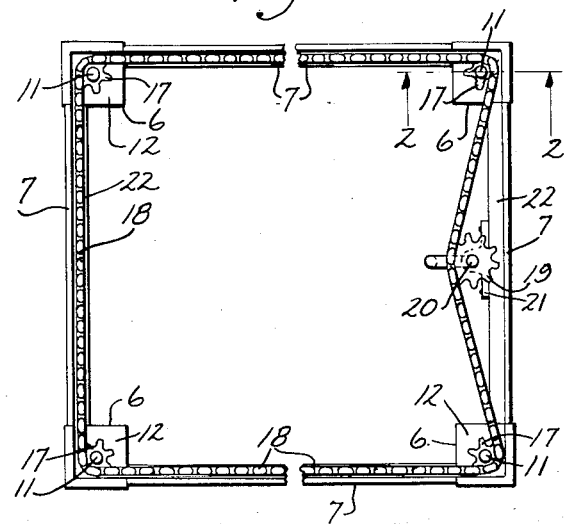
Figure 3 is a plan view of the table leg and rail organization with the top of the table removed.
Figure 4:
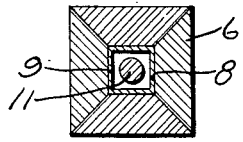
Figure 4 is a detail view in cross section in the plane indicated at 4—4 in Figure 2.

Each of the legs 6 has an interior opening at 8 in which a leg extension 9 is telescopically adjustable. The opening 8 and the extensible leg member 9 are preferably polygonal as indicated by the square cross section illustrated in Fig. 4. This cross section keeps the leg extension from rotating with the feed screw hereinafter to be described. At the upper end of each such leg extension 9 is a nut 10 threaded to an adjusting screw 11 which is confined against axial movement within opening 8 but is free to turn therein.

The means for fixing the axial position of adjusting screw 11 comprises a plate 12 fixed within a recess 13 in each leg to close the upper end of the central bore 8. The plate 12 is apertured to receive the unthreaded upper end of screw 11, and is engaged by collars 14 and 15 mounted on the screw. These collars engage the upper and lower surfaces of plate 12 to prevent movement of the screw in their axial direction with respect to the plate.

Collar 14 may comprise a hub of a toothed sprocket wheel 17 with which each screw 11 is provided within recess 13 at the upper end of the associated table leg. The several sprockets 17 are interconnected for simultaneous rotation by means of a chain 18 which passes about the table within the enclosure formed by top 5 and side rails 7. For convenience of operation the chain 18 preferably passes about a sprocket 19 carried by a cranked shaft 20 having suitable bearing at 21 on one of the side rails 7 with its crank portion depending in a position for convenient manipulation.

The side rails are preferably channeled as shown at 22 to receive and partially to conceal the chain 18.

It will be obvious that when the crank 20 is turned the several sprockets will be caused to rotate in unison and thereby to effect a corresponding rotation of the several screws 11. Thus, the engagement of said screws in the nut portions 10 of leg extensions 9 will cause said leg extensions to move telescopically inwardly or outwardly at an identical rate in either direction depending on the direction in which the cranked shaft 20 is turned by the operator. Thus all corners of the table may be raised or lowered simultaneously at the same rate.

I claim:

1. The combination with a table having a top and legs secured to the top and rails connecting the legs and disposed adjacent the top, said top, legs and rails providing a channel in a horizontal plane beneath said top open inwardly relative to said table, of leg extension members telescopically adjustable with respect to the several legs, screws housed within the respective legs in feed relation to said extension members, and chain and sprocket means connecting the several screws for simultaneous rotation and housed by said top, legs and rails within said channel.

2. A table structure comprising longitudinally apertured legs, extension leg members reciprocable and confined against rotation in the apertures of the several legs, rails connected with said legs, screw means for actuating the several leg extension members, and mechanism connecting the screw means of the various legs for simultaneous operation, said legs and rails being recessed longitudinally and transversely in a horizontal plane to receive and partially to enclose said mechanism.

3. A table structure comprising the combination with a set of legs having central bores of polygonal cross section and recesses opening horizontally inwardly adjacent their upper ends, of screw anchorage means applied to said legs, screws rotatable in and axially confined by said means, extension members reciprocable in said legs and provided with nuts to which said screws are threaded, rotors within the recesses of said legs and connected with the screws, and endless actuating connecting means extending about the several rotors for their simultaneous operation.

4. In a table structure, the combination with a set of legs each having a longitudinal bore and a recess adjacent its upper end, of an apertured plate applied to each leg at the bottom of said recess to partially close said bore, a screw rotatable in the aperture of said plate and provided with means confining it against axial movement in said bore, a leg extension member reciprocable in the bore of each leg and provided with nut means threaded to the screw therein, sprockets on the end portions of the screws in the recesses of the several legs, and chain means connecting the sprockets.

5. In a table structure, the combination with a set of legs each having a longitudinal bore and a recess adjacent its upper end, of an apertured plate applied to each leg at the bottom of said recess to partially close said bore, a screw rotatable in the aperture of said plate and provided with means confining it against axial movement in said bore, a leg extension member reciprocable in the bore of each leg and provided with nut means threaded to the screw therein, sprockets on the end portions of the screws in the recesses of the several legs, and chain means connecting the sprockets, together with rails connecting the legs and provided with recesses in which said chain means operate and are partially enclosed.

6. A table structure comprising the combination with a table top and a plurality of supporting legs each provided with a central opening of substantially square cross section and each being provided with an inwardly opening recess adjacent its upper end beneath said top, of extension leg members telescopically adjustable in the openings of the several legs and fitted thereto, whereby to be confined against rotation therein, each of said leg extension members having a nut threaded to the screw within its respective leg, plates applied to the respective legs at said recesses and provided with apertures in which the respective screws are rotatable, means carried by the screws for confining them against axial movement respecting said plates, sprockets carried by the several screws within the recesses, a chain connecting the sprockets for simultaneous movement, rails channeled in registry with the recesses of the legs whereby to be adapted to receive and partially enclose said chain, and a manually operated sprocket with which said chain is engaged and whereby the several leg extension members may be simultaneously operated.

HAROLD A. ARNOLD.